(12) United States Patent
Inui et al.

(10) Patent No.: US 6,648,233 B2
(45) Date of Patent: Nov. 18, 2003

(54) CODE READING METHOD AND DEVICE FOR RECORDING MATERIAL ROLL

(75) Inventors: Fuyuki Inui, Saitama (JP); Naoshi Sugiyama, Saitama (JP); Ryo Imai, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 78 days.

(21) Appl. No.: 09/919,887

(22) Filed: Aug. 2, 2001

(65) Prior Publication Data

US 2002/0020753 A1 Feb. 21, 2002

(51) Int. Cl.[7] .............................................. G06K 19/06
(52) U.S. Cl. ...................................... 235/494; 235/375
(58) Field of Search .......................... 235/92, 494, 375, 235/382, 380, 462.01–462.25, 454, 455; 101/181, 152, 178, 351

(56) References Cited

U.S. PATENT DOCUMENTS

| | | | | |
|---|---|---|---|---|
| 3,553,441 A | * | 1/1971 | Launder | .......................... 377/1 |
| 3,885,494 A | * | 5/1975 | Saueressig | .................. 101/181 |
| RE28,732 E | * | 3/1976 | von Hofe | ..................... 156/64 |
| 4,043,520 A | * | 8/1977 | Olsson et al. | ............. 242/554.1 |
| 5,816,165 A | * | 10/1998 | Huston | ........................ 101/490 |
| 6,210,052 B1 | * | 4/2001 | Smith | ........................... 400/62 |
| 2002/0020753 A1 | * | 2/2002 | Inui et al. | ................... 235/494 |

FOREIGN PATENT DOCUMENTS

EP         0 875 482 A1  * 4/1998

* cited by examiner

Primary Examiner—Thien M. Le
(74) Attorney, Agent, or Firm—Sughrue Mion, PLLC

(57) ABSTRACT

A recording sheet roll includes a winding core, about which a continuous recording sheet is wound. An information code is disposed on a surface of the winding core in an arc shape, and includes plural data indicia DM arranged serially. A start indicia SM is disposed between a beginning and end of a train of the plural data indicia DM, and has a size greater than each of the data indicia DM. A code reading device for the recording sheet roll includes a supply roller for rotating the recording sheet roll at a constant peripheral speed in a winding direction of the recording sheet. A reading photo sensor reads the plural data indicia DM and the start indicia SM. A timer at a CPU measures passage time during which plural indicia in the information code pass the reading photo sensor while the recording sheet roll makes one rotation, and thereafter rotates for a predetermined time T1. A system controller checks the passage time of each of the plural indicia to determine one of the plural indicia as the start indicia SM, so as to determine remaining ones of the plural indicia as the data indicia DM to read the information code.

34 Claims, 7 Drawing Sheets

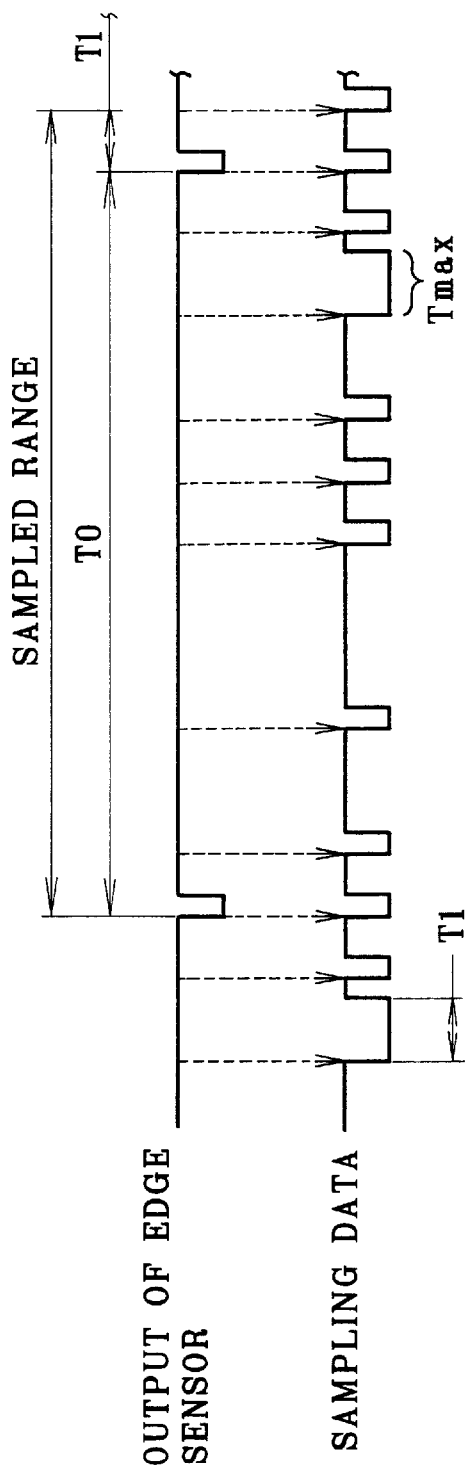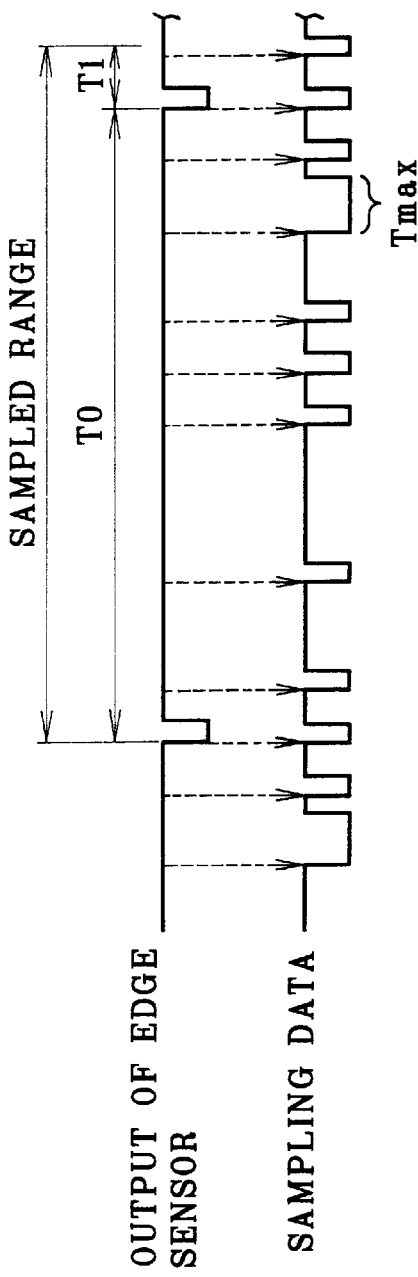

CODE READING METHOD AND DEVICE FOR RECORDING MATERIAL ROLL

BACKGROUND OF THE INVENTION

1. Field of the Invention

The present invention relates to a code reading method and device for a recording material roll. More particularly, the present invention relates to a code reading method and device for a recording material roll according to which an information code can be read with high precision.

2. Description Related to the Prior Art

Printers known in the art includes a photographic printer, thermal printer and the like. A recording sheet roll is used, and consists of a roll of continuous recording sheet such as photographic paper or thermosensitive recording sheet. After the printing, the continuous recording sheet is cut into each sheet by one image frame. The continuous recording sheet has photo sensitivity, optical fixability or the like. The recording sheet roll is set in a printer in a state contained in a supply magazine which is moisture-proof and shields ambient light.

Any type of thermosensitive recording sheet is changeable in density according to heat sensitivity. Also, there is a sticker type recording sheet well-known in the art. In general, the sticker type is used specially for printing thumbnail images arranged in a matrix form. Therefore, the recording sheet roll has an information code. In the recording sheet roll, a winding core is used and adapted to wind the recording sheet in a roll form. The information code is formed on an end surface of the winding core, and represents information such as a type, heat sensitivity, name of the manufacturer or the like of the recording sheet. The printer includes a code reading device for reading the information code, and determines printing conditions according to the information.

The information code is constituted by one start indicia and a plurality of data indicia. The start indicia has a size different from, or greater than, each of the data indicia, and is adapted to designate a position of starting reading of the data indicia. The data indicia are binary signs arranged at a predetermined pitch in a ring shape. Any of the start indicia and the data indicia are printed black in contrast with a white color of the end surface of the winding core.

To read the information code, a reading photo sensor is used and scans plural indicia in their arranging direction in rotation of the winding core and advancing the recording sheet. At first, the start indicia is designated, and then positions of the data indicia by referring to the start indicia. If one data indicia exists in each of the positions, then value of one (1) is retrieved. If no data indicia exists in one of the positions, then value of zero (0) is retrieved.

In a line printing type of printer, the recording sheet must be advanced at a constant speed irrespective of the amount of the remainder of the recording sheet. A supply roller is caused to contact the peripheral surface of the recording sheet roll about the winding core without directly controlling the winding core. The supply roller is driven at a constant speed to rotate the recording sheet roll. Thus, a roll diameter of the recording sheet roll changes with changes in the remaining amount of the recording sheet. An amount of advancing the recording sheet per one rotation of the winding core decreases in the course of a decrease in the roll diameter of the recording sheet roll. It is necessary to predetermine a rotating amount of the winding core for reading the information code in consideration of the maximum diameter of the recording sheet roll. When the recording sheet roll comes to have a very small diameter with a decrease in the recording sheet, a considerably high number of rotations must be made. Also, a process of detecting the start indicia is very complicated.

In a prior technique, a maximum detected size of the indicia is extracted from plural detection signals from the reading sensor. An indicia associated with the maximum detected size is determined as the start indicia. The roll diameter of the recording sheet is obtained according to the size of the start indicia, to designate a position of each of the data indicia. However, this technique requires high precision of detecting the size of the start indicia and the indicia positions. There is a serious problem in occurrence of jitter or fluctuation in circuits in a manner inconsistent to keeping precision in designating the start indicia. Errors in positions to read data are likely to occur, to lower precision in the detecting the information code.

SUMMARY OF THE INVENTION

In view of the foregoing problems, an object of the present invention is to provide a code reading method and device for a recording material roll according to which precision in reading an information code can be kept high.

In order to achieve the above and other objects and advantages of this invention, a code reading device for a recording material roll is provided, the recording material roll including a winding core, a recording material wound about the winding core, and an information code disposed on a surface of the winding core in an arc shape, the information code including plural data indicia arranged serially, and a start indicia disposed between beginning and ending ones of the plural data indicia, and having a size greater than each of the data indicia in an arranging direction thereof. The code reading device includes a rotating mechanism for rotating the recording material roll at a constant peripheral speed in a winding direction of the recording material. A reading sensor reads the plural data indicia and the start indicia. A timer measures passage time during which plural indicia in the information code pass the reading sensor while the recording material roll makes one rotation and thereafter rotates for a predetermined time. A controller checks the passage time of each of the plural indicia to determine one of the plural indicia as the start indicia, so as to determine remaining ones of the plural indicia as the data indicia to read the information code.

The plural data indicia have respectively a dot shape or bar shape, are arranged in a predetermined number of digits, have either high density or low density, and represent binary data.

The timer measures first elapsed time elapsed while the recording material roll makes one rotation. The controller obtains expected elapsed time related to passage of the start indicia according to a size of the start indicia and the first elapsed time, and checks whether the passage time of each of the plural indicia comes up to the expected elapsed time, wherein one of the plural indicia is determined as the start indicia when the passage time of the one indicia comes up to the expected elapsed time.

Furthermore, a front edge sensor detects a front edge of the recording material for at least two times while the recording material roll rotates. The timer measures the first elapsed time by measuring time between two successive output signals from the front edge sensor.

The controller extracts a longest passage time among plural values of the passage time measured from respectively the plural indicia in the information code, to compare the longest passage time with the expected elapsed time.

Start indicia passage time elapses while the start indicia passes the reading sensor, the start indicia passage time is changeable with a diameter of the recording material roll, and the predetermined time is a maximum value of the start indicia passage time.

The controller determines the one indicia in the plural indicia as the start indicia if a condition $$(1-\beta)\cdot SMT1 \leq Tmax \leq (1+\beta)\cdot SMT1$$

is satisfied, wherein SMT1 is the expected elapsed time, Tmax is the longest passage time, and $\beta$ is a small tolerable error.

The information code is formed on an end surface of the winding core.

In a preferred embodiment, the information code is formed on an inner surface of the winding core. Furthermore, first and second holder bodies are secured to respectively first and second ends of the winding core. First and second support shafts are disposed stationarily, for supporting respectively the first and second holder bodies in a rotatable manner. The reading sensor is secured to the first support shaft.

In another preferred embodiment, the information code is preprinted on the surface of the winding core.

In a further preferred embodiment, the recording material roll further comprises a code sticker previously provided with the information code, and secured to the surface of the winding core.

In still another preferred embodiment, a diameter of the recording material roll is changeable from a maximum diameter Dmax to a minimum diameter Dmin. The data indicia has a size LDM, the start indicia has a size LSM, and satisfies a condition of:

$$LSM\cdot(Dmin/Dmax) > LDM.$$

Start indicia passage time elapses while the start indicia passes the reading sensor, data indicia passage time elapses while each of the data indicia passes the reading sensor. The start indicia passage time and the data indicia passage time are changeable with a diameter of the recording material roll, and a minimum value of the start indicia passage time is longer than a maximum value of the data indicia passage time. The checking step includes comparing the passage time of each of the plural indicia with reference time, the reference time being predetermined between the minimum value of the start indicia passage time and the maximum value of the data indicia passage time, the one indicia being determined as the start indicia if the passage time of the one indicia is equal to or more than the reference time.

BRIEF DESCRIPTION OF THE DRAWINGS

The above objects and advantages of the present invention will become more apparent from the following detailed description when read in connection with the accompanying drawings, in which:

FIG. 5A is a timing chart illustrating a waveform of sampling data at the time that the roll has the maximum diameter;

FIG. 5B is a timing chart illustrating a waveform of sampling data at the time that the roll has a reduced diameter;

DETAILED DESCRIPTION OF THE PREFERRED EMBODIMENT(S) OF THE PRESENT INVENTION

Figure 1:
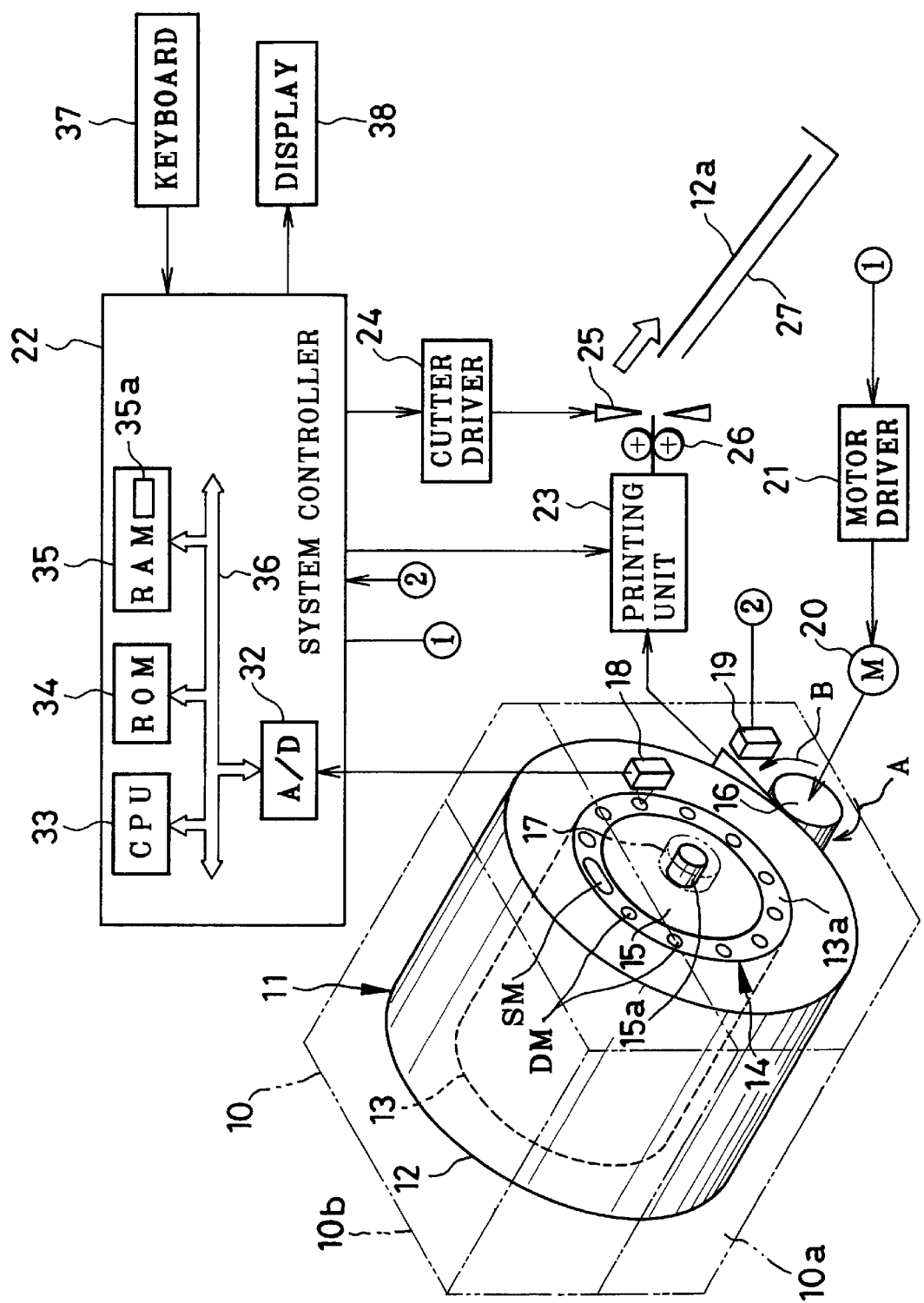
FIG. 1 is an explanatory view illustrating a thermal printer having a code reading device of the invention.

In FIG. 1, a color thermal printer illustrated. A supply magazine 10 contains a recording sheet roll 11 as recording material roll. The recording sheet roll 11 is a roll of continuous recording sheet 12 as recording material wound about a winding core 13. The winding core 13 is formed from paper, cardboard or plastic material. An end surface 13a of the winding core 13 has an information code 14 printed thereon. A roll holder 15 is fitted on each of ends of the winding core 13. A support shaft or holder body 15a is included in the roll holder 15, and keeps the recording sheet roll 11 supported in the supply magazine 10 in a rotatable manner.

The supply magazine 10 includes a magazine body 10a and a magazine lid 10b, and contains a supply roller 16 as rotating mechanism, a shaft receiver mechanism 17, a reading photo sensor 18 and a front edge sensor 19. The supply roller 16 rotates in the arrow direction A in contact with the recording sheet roll 11 so as to advance the continuous recording sheet 12 from the supply magazine 10. When the supply roller 16 rotates in the arrow direction B, the continuous recording sheet 12 is wound into the supply magazine 10. The reading photo sensor 18, to be described later, reads the information code 14 of the winding core 13. The front edge sensor 19 detects a front edge of the continuous recording sheet 12.

The shaft receiver mechanism 17 supports the support shaft 15a of the roll holder 15 in a rotatable manner. The shaft receiver mechanism 17 is movable toward the supply roller 16. No matter how a diameter D of the recording sheet roll 11 decreases, the recording sheet roll 11 always contacts the supply roller 16. A motor 20 in the rotating mechanism drives the supply roller 16. A motor driver 21 is connected with a system controller 22, and drives the motor 20 in a controlled manner.

At the time of printing, the motor 20 rotates in the arrow direction A, so a printing unit 23 is provided with the continuous recording sheet 12. The printing unit 23 has a construction including a thermal head well-known in the art, and prints a full-color image according to three-color frame sequential printing. To prevent development of color having been printed, ultraviolet rays are applied for optical fixation of a coloring layer of the same color before printing of next color. Upon the completion of the three-color frame sequential printing, a cutter driver 24 drives a cutter 25. The cutter 25 cuts a recording sheet 12a or a printed portion of the continuous recording sheet 12 away from its unused portion. Ejection rollers 26 rotate to set the continuous recording sheet 12 in a cutting position. The recording sheet 12a is ejected to a tray 27.

Before the printing is started, the information code 14 of the recording sheet roll 11 set in the supply magazine 10 is read, so as to recognize the type of the recording sheet roll 11 and determine conditions of the printing.

Figure 2:
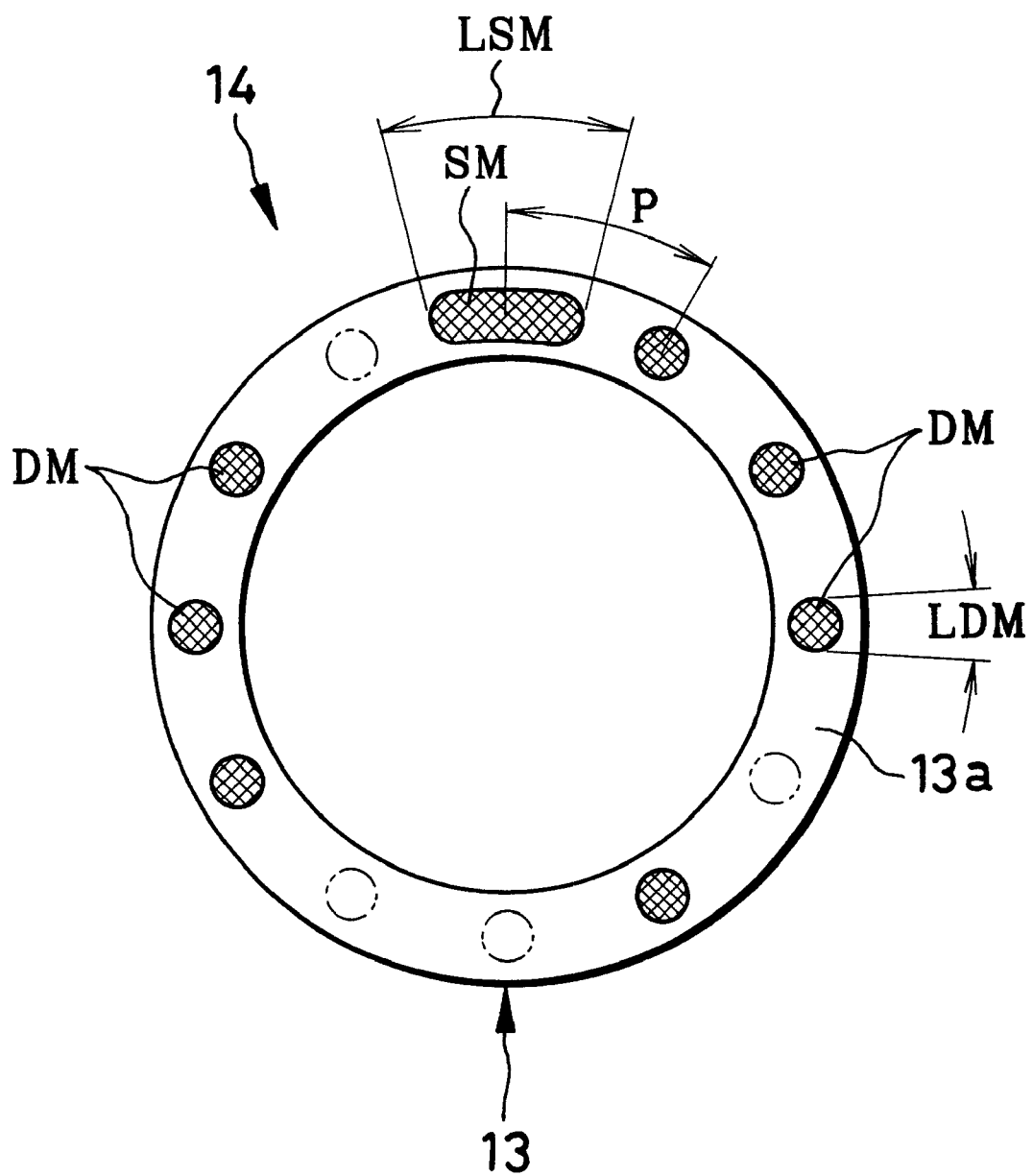
FIG. 2 is a front elevation illustrating an end surface of a winding core having an information code.

In FIG. 2, the information code 14 is disposed at the end surface 13a and has portions arranged in a ring shape or arc shape. The portions include a single start indicia SM and plural data indicia DM printed on a white base portion of the end surface 13a. The start indicia SM is black and has an arc shape. The plural data indicia DM are black and have a circular shape. As the information code 14 is a binary code of 11 bits, there are 11 positions or digits to print the data indicia DM. The set of the data indicia DM in the information code 14 represents information such as a type, heat sensitivity, lot number, manufacturing date or the like of the continuous recording sheet 12. Note that the information represented by the information code 14 may be at least one of those various types of information.

The start indicia SM and data indicia DM are arranged at a pitch P of 30 degrees. Existence of the data indicia DM represents information of one (1). Lack of a data indicia DM in a position of the pitch P of 30 degrees represents information of zero (0). In FIG. 2, the start indicia SM has a size LSM three times as great as a size LDM of each of the data indicia DM. Note that, although portions representing zero (0) are indicated by the phantom lines, there is no discernible line or color at those portions. Those are kept blank in the end surface 13a.

In FIG. 1, the information code 14 is read by the reading photo sensor 18. The reading photo sensor 18 is a reflection type and is a unit including a light projector, photo receptor and amplifier. Light projected by the light projector becomes incident upon the information code 14, and reflected by the same to strike the photo receptor. In response, a photoelectric signal is generated, amplified by the amplifier, and sent to the system controller 22. Note that, according to a decrease in the diameter D of the recording sheet roll 11, the shaft receiver mechanism 17 is shifted down toward the supply roller. Thus, the reading photo sensor 18 is positioned fixedly on the shaft receiver mechanism 17 without rotation to follow movement of the shaft receiver mechanism 17.

The front edge sensor 19 detects a front edge of the continuous recording sheet 12, and sends a detection signal to the system controller 22. The front edge sensor 19 is adapted to check whether the front edge of the continuous recording sheet 12 has come into the supply magazine 10 upon winding back the continuous recording sheet 12. The system controller 22, in response to the detection signal, stops the motor 20 to terminate the rewinding of the continuous recording sheet 12. Also, the detection signal from the front edge sensor 19 is used in reading the information code 14, which will be described later. It is to be noted that the front edge sensor 19 is a micro switch which has an actuator for swinging by detecting the front edge of the continuous recording sheet 12. Furthermore, it is possible to use a photo sensor for detecting the front edge of the continuous recording sheet 12 instead of the mechanical micro switch.

An A/D convertor 32 is included in the system controller 22, and converts a scanning signal from the reading photo sensor 18 into a digital form. The system controller 22 is a micro computer including a CPU 33 with a timer, a ROM 34, a RAM 35, a bus 36, a keyboard 37, a display 38 and the like. A data memory 35a included in RAM 35 is caused to store sampling data generated by the A/D convertor 32. The sampling data is analyzed to read each of the bits. Furthermore, the system controller 22 evaluates the result of the reading and determines the type, heat sensitivity, manufacture, route of distribution, and the like of the continuous recording sheet 12. According to the designated data, conditions of printing are set.

Figure 3:
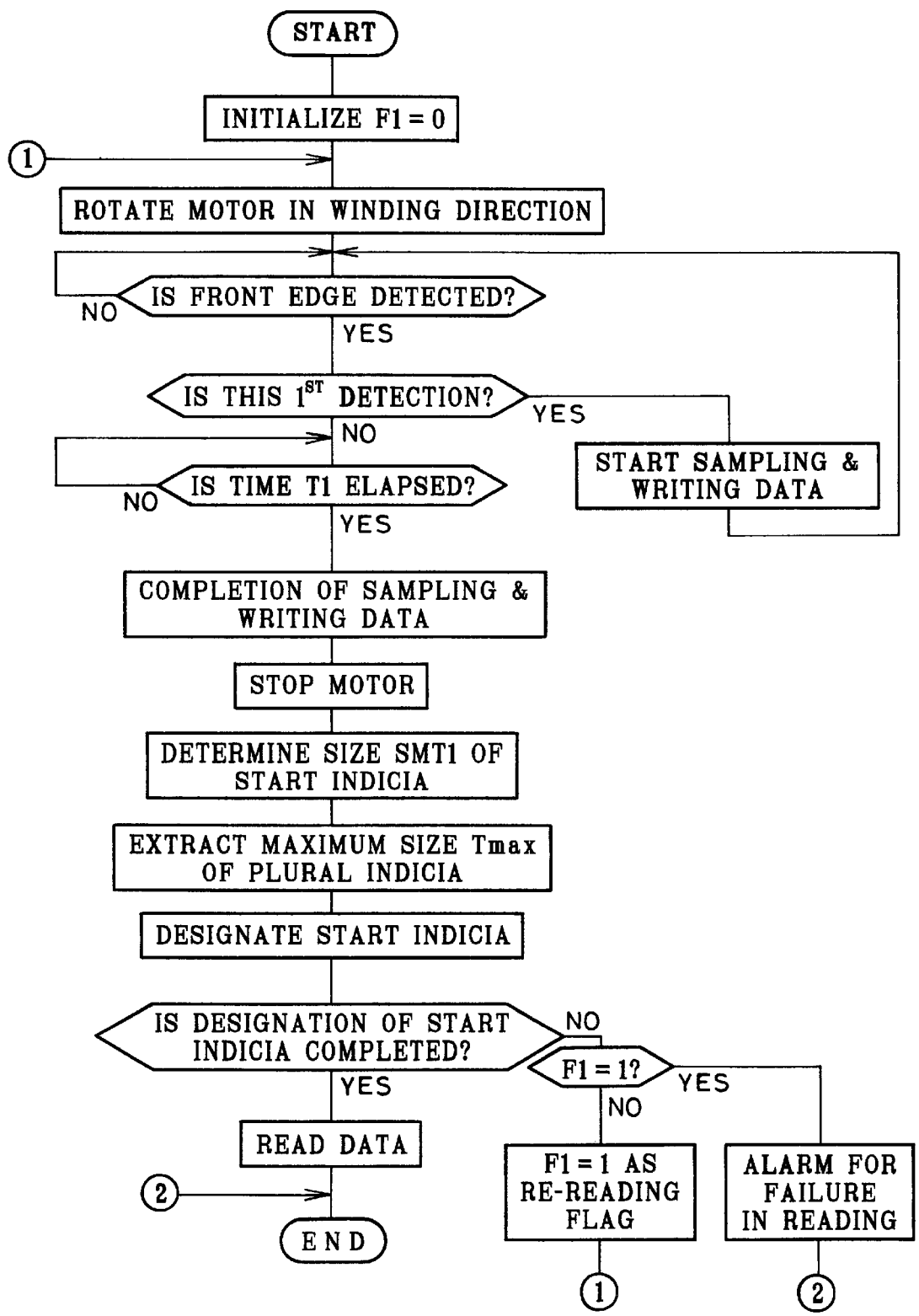
FIG. 3 is a flow chart illustrating a process of reading the information code.

FIG. 3 illustrates a flow of reading the information code. At first, a re-reading flag F1 is reset as zero (0) for initialization. The motor 20 is rotated in the winding direction B of the continuous recording sheet 12. The supply roller 16 is driven to rotate the winding core 13 in the winding direction. Also, the front edge sensor 19 detects a front edge of the continuous recording sheet 12. Sampling data generated by the reading photo sensor 18 are written to the data memory 35a in lapse of constant time T1 which starts upon detection of the front edge at the front edge sensor 19 and ends upon a second detection of the front edge at the front edge sensor 19.

Figure 4:
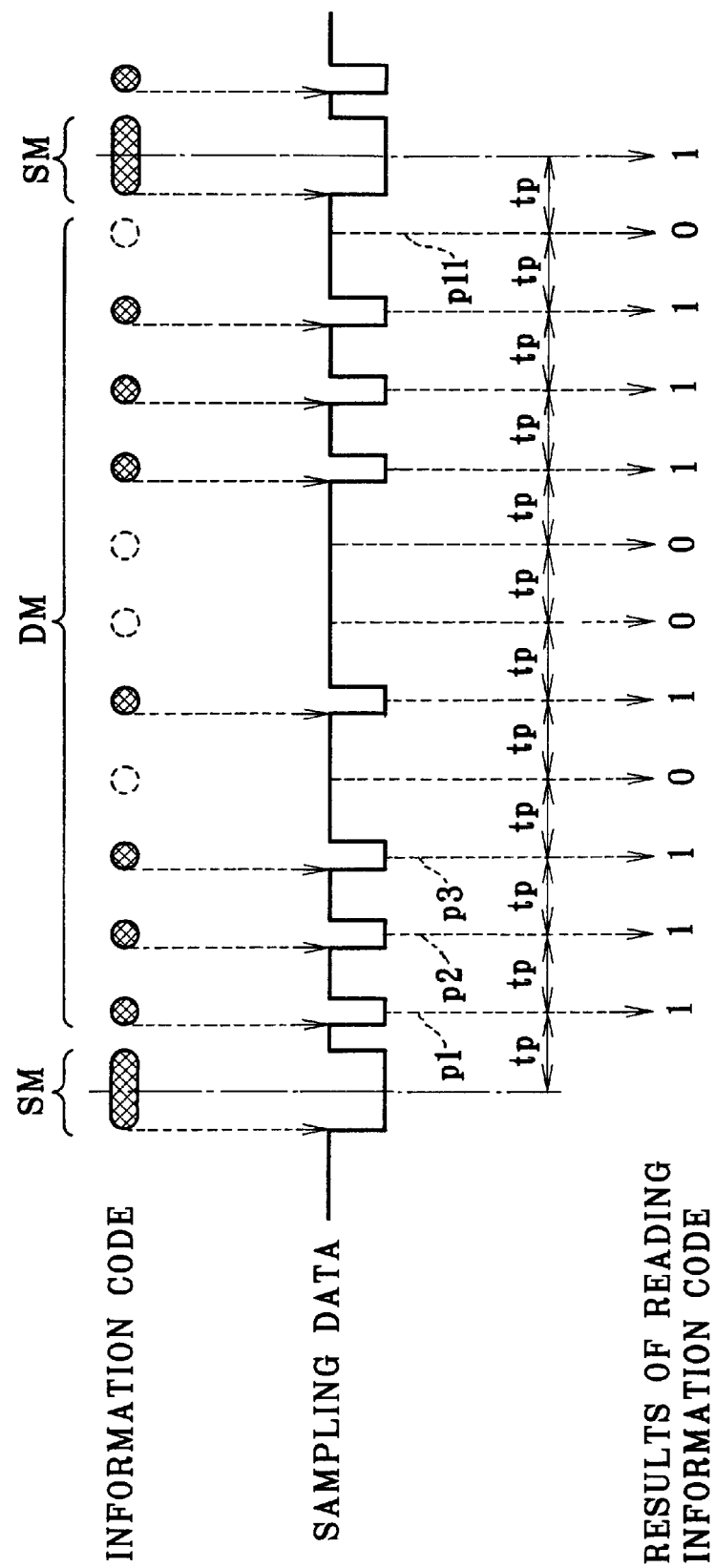
FIG. 4 is a timing chart illustrating a waveform of sampling data.

In FIG. 4, an example of the sampling data from the reading photo sensor 18 is depicted. The plural indicia included in the information code 14 are associated respectively with the sampling data and results of reading the sampling data.

In FIGS. 5A and 5B, the time T1 is start indicia passage time which elapses while the start indicia SM passes the reading photo sensor 18 in a state of the recording sheet roll 11 having the maximum diameter D before being used. The time T1 is added to the time T0 which elapses during one rotation of the recording sheet roll 11, to use the time of the sum for detection of an indicia. This makes it possible that the sampling data always include data of the single start indicia without interruption.

While the continuous recording sheet 12 becomes wound, the system controller 22 counts clock signals generated between first and second signals from the front edge sensor 19 upon detecting the front edge. According to the clock signals, a start indicia size SMT1 (expected elapsed time) is calculated as a value depending upon the present diameter D of the roll. Then the largest indicia size Tmax (longest passage time) in the sampling data is compared with the start indicia size SMT1. If the largest indicia size Tmax is within a tolerable range $$0.9 \cdot SMT1 \leq T\max \leq 1.1 \cdot SMT1$$

for discerning the start indicia, then the indicia having the largest indicia size Tmax is determined as a start indicia SM. Note that the tolerable range may be determined in a manner other than ±10%.

After the start indicia SM is designated, recording positions of the data indicia DM are designated according to sampling data of one rotation of the winding core 13 with reference to the center line passing the center of the start indicia SM. Then a pitch-converted time tp of each indicia is obtained by dividing time T0 of one rotation of the winding core 13 by the number of indicia. The pitch-converted time tp is multiplied by natural numbers of 1, 2, 3 and so on, to determine data recording positions p1, p2, p3, . . . , p11 in the present remainder of the recording material. A value of each of the digits is determined according to 1 or 0 of the sampling data for each of the data recording positions p1–p11. A result of reading the information code from the sampling data of FIG. 4 is 11101001110.

Figure 6A:
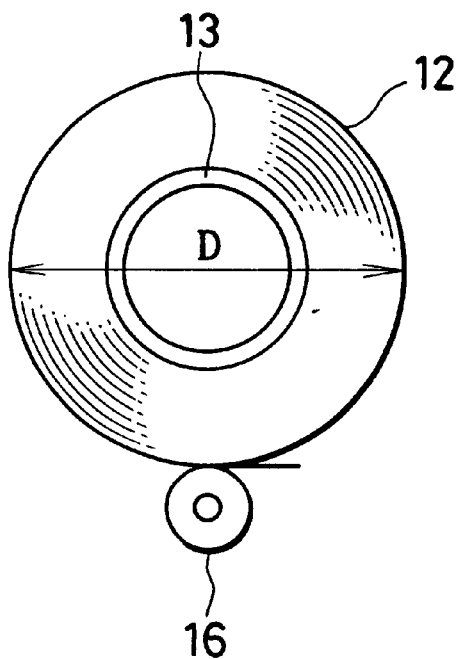
FIG. 6A is a front elevation illustrating a supply roller and the roll with the maximum diameter.
Figure 6B:
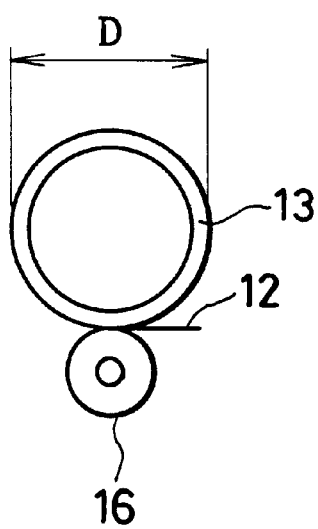
FIG. 6B is a front elevation illustrating the supply roller and the roll with the minimum diameter.
Figure 6C:
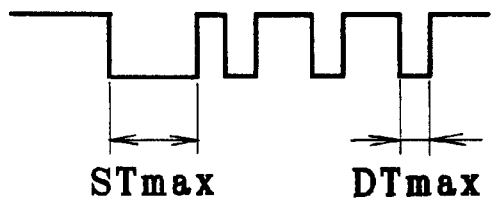
FIG. 6C is a timing chart illustrating a waveform of the sampling data in the state of FIG. 6A.
Figure 6D:
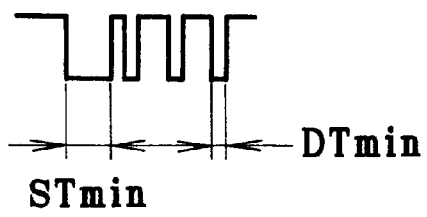
FIG. 6D is a timing chart illustrating a waveform of the sampling data in the state of FIG. 6B.

Another preferred determination of a start indicia is described by referring to FIGS. 6A, 6B, 6C and 6D. DTmax in FIG. 6C is a data indicia size detected according to a maximum roll diameter D in FIG. 6A (or maximum expected elapsed time of passage of a data indicia DM). STmin in FIG. 6D is a start indicia size detected according to a minimum roll diameter D in FIG. 6B (or minimum expected elapsed time of passage of a start indicia SM). The sizes LSM and LDM of the start indicia SM and data indicia DM are determined so as to satisfy the condition of STmin>DTmax.

A time value of the size of the start indicia SM can be set higher than a time value of the size of the data indicia DM at any time. Therefore, a start indicia can be recognized if an indicia size (or time of passage of indicia) is equal to or more than STmin. This is very effective instead of the above operation of using the tolerable range. It is to be noted that the present embodiment may be combined with the above operation with the tolerable range.

Figure 7:
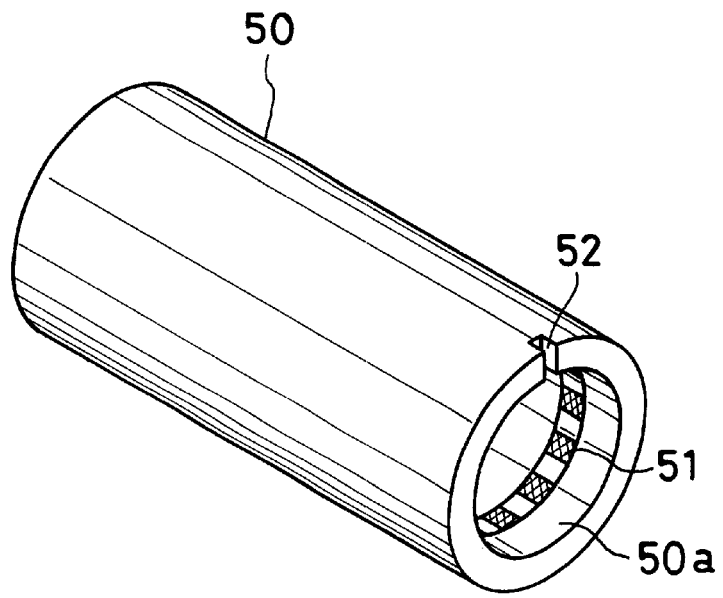
FIG. 7 is a perspective illustrating another preferred winding core of which an inner surface has an information code.

In the above embodiment, the information code 14 is formed on a the end surface 13a. In FIG. 7, another preferred embodiment is depicted, in which an information code 51 is formed on an inner surface 50a and close to an end of a winding core 50. A code sticker is previously produced. The code sticker includes a sticker sheet and the information code 51 formed thereon, and is attached to the inner surface 50a in an orientation to lie in a ring-shaped manner. Alternatively, the information code 51 may be formed by printing. An ink jet printing head or the like can be used for printing the information code 51 on the inner surface 50a with ink or printing material. As a result, the winding core 50 with the information code 51 is advantageous in that existence of the information code 51 cannot be easily found. Also, the information code 51 does not appear externally in a manner of the information code 14 on the end surface 13a. This is effective in protecting the information code 51 from being damaged.

Figure 8:
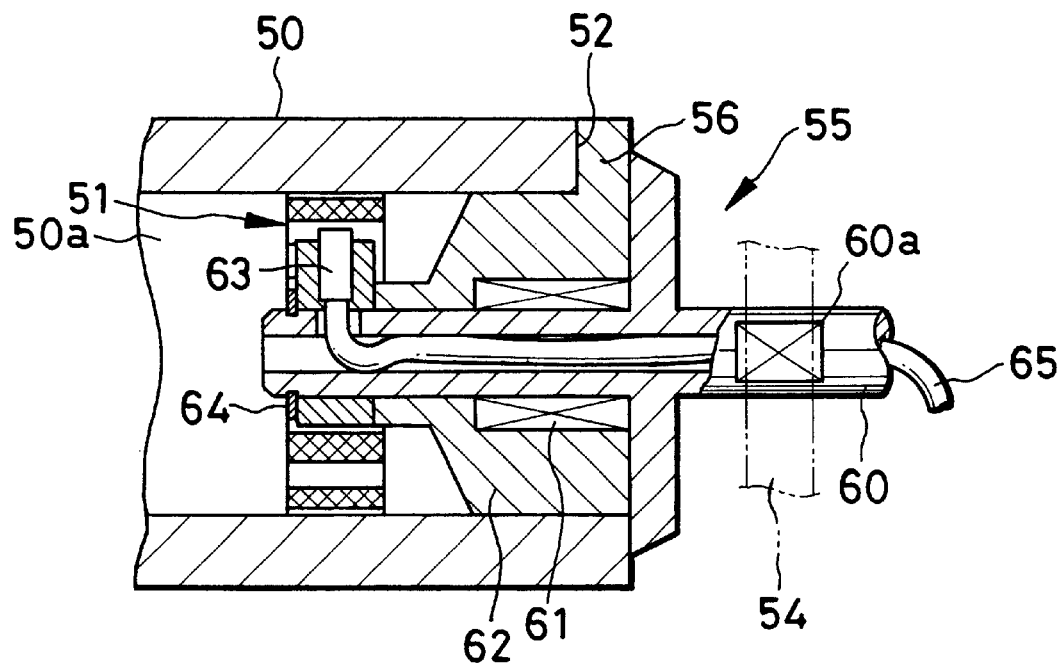
FIG. 8 is a vertical section, partially broken, illustrating a roll holder for use with the winding core of FIG. 7 and having a reading photo sensor.

For use with the winding core 50, a specialized type of roll holder 55 having a photo sensor is described now in combination with the inner surface 50a with the information code 51 printed thereon. See FIG. 8. A first end of the winding core 50 is fitted on a conventional type of a roll holder. Both roll holders are set in a supply magazine in a rotatable manner. A remaining end of the winding core 50 is fitted on the roll holder 55 having a reading photo sensor 63. There is a notch 52 formed in a core end of the winding core 50 having the information code 51, and adapted to checking the correct type of the roll holder 55 to be set without an error. A projection 56 is formed to project from the roll holder 55, and becomes engaged with the notch 52. If the roll holder 55 is directed to the first end of the winding core 50 without the information code 51, a user is caused to find an error in the setting of the roll holder 55 because of lack of the notch 52. Note that, instead of the notch 52 and the projection 56, it is possible to form the information code 51 at each of both of the core ends of the winding core 50. This makes it possible to set the roll holder 55 at any of the core ends. Also, the notch 52 and the projection 56 may be eliminated.

The roll holder 55 with the photo sensor is constituted by a support shaft or sleeve 60, a holder body 62, the reading photo sensor 63 and an E-ring 64. The holder body 62 is secured to the support shaft 60 by means of a shaft receiver 61 in a rotatable manner. The reading photo sensor 63 and the E-ring 64 are secured to an end of the support shaft 60. A frame 54 of the supply magazine is adapted to supporting the support shaft 60 in a rotationally immovable manner with a regulating inclined surface 60a.

The reading photo sensor 63 is set to face the information code 51 while the roll holder 55 is fitted on the winding core 50. A wire harness 65 sends a signal from the reading photo sensor 63 to the controller. Reading of the information code 51 is similar to that according to the above embodiment.

Also, the information code 51 may be formed to extend in parallel with an axis of the winding core 50 instead of the ring shape. For this structure, a rotational movement of the winding core 50 is converted to backward and forward straight movement in parallel with the axis to read the information code. Various types of mechanisms may be used to convert the rotational movement to the back and forward movement. For example, an intermediate barrel may have a cam groove, which operates to move a photo sensor with parallelism. Alternatively, a planetary gear train or a combination of rack and worm may be used for the movement with parallelism.

In the above embodiments, the positions of data indicia are arranged at a pitch of 30 degrees to represent binary data of 1 or 0. However, the pitch may be different from 30 degrees in compliance with the number of digits of the information code.

Also, a variant of detection of the start indicia SM may be used. For example, plural values of passage time of each indicia in the information code 14, 51 are measured, and compared with one another to discover one indicia with the longest one of the passage times. The one discovered indicia may be determined as a start indicia.

Furthermore, plural values of passage time of the indicia in the information code 14, 51 may be measured. The elapsed time of one turn may be divided by each value of the passage time to obtain a ratio or a central angle of an indicia. The ratio may be converted into information of one of the data indicia DM and the start indicia SM by means of table data or the like.

Note that, although the data indicia are dots in the above embodiments, data indicia in the information code may be plural bars. Also, an information code of the invention may be a rotary bar code. Although each digit in the information code according to the above embodiments is binary, an information code may have digits of notation other than a binary notation. In the above embodiments, the end surface 13a and the inner surface 50a are white. Alternatively, the end surface 13a and the inner surface 50a may have a silver color or may be a mirror surface in contrast with the information codes 14 and 51 being black. Furthermore, it is possible to invert the black and white colors between the information codes 14 and 51 and a ground portion of the end surface 13a and the inner surface 50a defined about the information codes 14 and 51.

In the above embodiments, the printer is the thermal printer. However, a recording sheet roll of the invention may be for use with a printer of any type. For example, a printer may be a photographic printer. A recording sheet roll may be a roll of photographic paper. Also, recording material to be wound in a roll form may be sheet, film or other material with a small thickness. Furthermore, a roll with an information code according to the invention may be a roll without recording material. A roll may be any type of a rotational body with information represented by the information code.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A code reading method for a recording material roll, said recording material roll including a winding core, a recording material wound about said winding core, and an information code disposed on a surface of said winding core in an arc shape, said information code including plural data indicia arranged serially, and a start indicia disposed between beginning and ending ones of said plural data indicia, and having a size greater than each of said data indicia in an arranging direction thereof, said code reading method comprising steps of:

rotating said recording material roll at a constant peripheral speed in a winding direction of said recording material;

while said recording material roll makes one rotation and thereafter rotates for a predetermined time, measuring passage time during which plural indicia in said information code pass said reading sensor; and checking said passage time of each of said plural indicia to determine one of said plural indicia as said start indicia, so as to determine remaining ones of said plural indicia as said data indicia to read said information code.

2. A code reading method as defined in claim 1, wherein said plural data indicia have respectively a dot shape or bar shape, are arranged in a predetermined number of digits, have either high density or low density, and represent binary data.

3. A code reading method as defined in claim 1, further comprising steps of:

measuring first elapsed time elapsed while said recording material roll makes one rotation;

obtaining expected elapsed time related to passage of said start indicia according to a size of said start indicia and said first elapsed time;

said checking step includes checking whether said passage time of each of said plural indicia comes up to said expected elapsed time, wherein one of said plural indicia is determined as said start indicia when said passage time of said one indicia comes up to said expected elapsed time.

4. A code reading method as defined in claim 3, wherein said step of measuring said first elapsed time includes:

while said recording material roll rotates, detecting a front edge of said recording material for at least two times in a predetermined sensor position; and measuring time between said two times of detecting said front edge.

5. A code reading method as defined in claim 4, further comprising a step of extracting a longest passage time among plural values of said passage time measured from respectively said plural indicia in said information code, to compare said longest passage time with said expected elapsed time.

6. A code reading method as defined in claim 5, wherein start indicia passage time elapses while said start indicia passes said reading sensor, said start indicia passage time is changeable with a diameter of said recording material roll, and said predetermined time is a maximum value of said start indicia passage time.

7. A code reading method as defined in claim 6, wherein said checking step determines said one indicia in said plural indicia as said start indicia if a condition $$(1-\beta)\cdot SMT1 \leq Tmax \leq (1+\beta)\cdot SMT1$$

is satisfied, wherein SMT1 is said expected elapsed time, Tmax is said longest passage time, and $\beta$ is a small tolerable error.

8. A code reading method as defined in claim 7, said information code is formed on an end surface of said winding core.

9. A code reading method as defined in claim 7, wherein said information code is formed on an inner surface of said winding core.

10. A code reading method as defined in claim 1, wherein said information code is preprinted on said surface of said winding core.

11. A code reading method as defined in claim 1, wherein said recording material roll further comprises a code sticker previously provided with said information code, and secured to said surface of said winding core.

12. A code reading method as defined in claim 1, wherein start indicia passage time elapses while said start indicia passes said reading sensor, data indicia passage time elapses while each of said data indicia passes said reading sensor;

said start indicia passage time and said data indicia passage time are changeable with a diameter of said recording material roll, and a minimum value of said start indicia passage time is longer than a maximum value of said data indicia passage time;

said checking step includes comparing said passage time of each of said plural indicia with reference time, said reference time being predetermined between said minimum value of said start indicia passage time and said maximum value of said data indicia passage time, said one indicia being determined as said start indicia if said passage time of said one indicia is equal to or more than said reference time.

13. A code reading method as defined in claim 12, wherein said diameter of said recording material roll is changeable from a maximum diameter Dmax to a minimum diameter Dmin;

said data indicia has a size LDM, said start indicia has a size LSM, and satisfies a condition of:

$$LSM\cdot(Dmin/Dmax) > LDM.$$

14. A code reading device for a recording material roll, said recording material roll including a winding core, a recording material wound about said winding core, and an information code disposed on a surface of said winding core in an arc shape, said information code including plural data indicia arranged serially, and a start indicia disposed between beginning and ending ones of said plural data indicia, and having a size greater than each of said data indicia in an arranging direction thereof, said code reading device comprising:

a rotating mechanism for rotating said recording material roll at a constant peripheral speed in a winding direction of said recording material;

a reading sensor for reading said plural data indicia and said start indicia;

a timer for measuring passage time during which plural indicia in said information code pass said reading sensor while said recording material roll makes one rotation and thereafter rotates for a predetermined time; and a controller for checking said passage time of each of said plural indicia to determine one of said plural indicia as said start indicia, so as to determine remaining ones of said plural indicia as said data indicia to read said information code.

15. A code reading device as defined in claim 14, wherein said plural data indicia have respectively a dot shape or bar shape, are arranged in a predetermined number of digits, have either high density or low density, and represent binary data.

16. A code reading device as defined in claim 15, wherein said timer measures first elapsed time elapsed while said recording material roll makes one rotation;

said controller obtains expected elapsed time related to passage of said start indicia according to a size of said start indicia and said first elapsed time, and checks whether said passage time of each of said plural indicia comes up to said expected elapsed time, wherein one of said plural indicia is determined as said start indicia when said passage time of said one indicia comes up to said expected elapsed time.

17. A code reading device as defined in claim 16, further comprising a front edge sensor for detecting a front edge of said recording material for at least two times while said recording material roll rotates;

said timer measures said first elapsed time by measuring time between two successive output signals from said front edge sensor.

18. A code reading device as defined in claim 17, wherein said controller extracts a longest passage time among plural values of said passage time measured from respectively said plural indicia in said information code, to compare said longest passage time with said expected elapsed time.

19. A code reading device as defined in claim 18, wherein start indicia passage time elapses while said start indicia passes said reading sensor, said start indicia passage time is changeable with a diameter of said recording material roll, and said predetermined time is a maximum value of said start indicia passage time.

20. A code reading device as defined in claim 19, wherein said controller determines said one indicia in said plural indicia as said start indicia if a condition $$(1-\beta) \cdot SMT1 \leq Tmax \leq (1+\beta) \cdot SMT1$$

is satisfied, wherein SMT1 is said expected elapsed time, Tmax is said longest passage time, and $\beta$ is a small tolerable error.

21. A code reading device as defined in claim 20, said information code is formed on an end surface of said winding core.

22. A code reading device as defined in claim 20, wherein said information code is formed on an inner surface of said winding core;

further comprising:

first and second holder bodies secured to respectively first and second ends of said winding core;

first and second support shafts, disposed stationarily, for supporting respectively said first and second holder bodies in a rotatable manner;

wherein said reading sensor is secured to said first support shaft.

23. A code reading device as defined in claim 14, wherein said information code is preprinted on said surface of said winding core.

24. A code reading device as defined in claim 14, wherein said recording material roll further comprises a code sticker previously provided with said information code, and secured to said surface of said winding core.

25. A code reading device as defined in claim 14, wherein a diameter of said recording material roll is changeable from a maximum diameter Dmax to a minimum diameter Dmin;

said data indicia has a size LDM, said start indicia has a size LSM, and satisfies a condition of:

$$LSM \cdot (Dmin/Dmax) > LDM.$$

26. A code reading method as defined in claim 1, wherein said winding core is fitted on a roll holder wherein information code is located at one end of said roll holder.

27. A code reading device as described in claim 14, wherein said winding core is fitted on a roll holder wherein information code is located at one end of said roll holder.

28. A code reading method as defined in claim 1, wherein said winding core is fitted on a roll holder wherein said information code is located at both ends of said roll holder.

29. A code reading device as described in claim 14, wherein said winding core is fitted on a roll holder wherein said information code is located at both ends of said roll holder.

30. A code reading method for a recording material roll according to claim 1, wherein said recording material is formed from a material different than said winding core.

31. A code reading device for a recording material roll according to claim 14, wherein said recording material roll is formed from a material different than said winding core.

32. A code reading device for a recording material roll according to claim 14, wherein said starting indicia consumes more space on said winding core than said remaining indicia.

33. A code reading method for a recording material roll according to claim 1, wherein said starting indicia consumes more space on said winding core than said remaining indicia.

34. A code reading device for a recording material roll according to claim 14, wherein the length between immediately neighboring indicia of said plural data indicia determines an amount of medium left on the roll, wherein the immediately neighboring indicia are equally spaced.

* * * * *

UNITED STATES PATENT AND TRADEMARK OFFICE
CERTIFICATE OF CORRECTION

PATENT NO.   : 6,648,233 B2
DATED        : November 18, 2003
INVENTOR(S)  : Fuyuki Inui, Naoshi Sugiyama and Ryo Imai It is certified that error appears in the above-identified patent and that said Letters Patent is hereby corrected as shown below:

<u>Title page,</u>
Insert Item
-- [30]  Foreign Application Priority Data
Japanese Patent Application No. 2000-234076 filed on August 2, 2000 --

Signed and Sealed this

Third Day of February, 2004

JON W. DUDAS
*Acting Director of the United States Patent and Trademark Office*